United States Patent
Noh et al.

(10) Patent No.: US 12,401,020 B2
(45) Date of Patent: Aug. 26, 2025

(54) ARTIFICIAL GRAPHITE, METHOD FOR PREPARING ARTIFICIAL GRAPHITE, ANODE COMPRISING SAME, AND LITHIUM SECONDARY BATTERY

(71) Applicant: LG ENERGY SOLUTION, LTD., Seoul (KR)

(72) Inventors: Suk-In Noh, Daejeon (KR); Sang-Wook Woo, Daejeon (KR); Yong-Ju Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 587 days.

(21) Appl. No.: 17/774,648

(22) PCT Filed: Jan. 8, 2021

(86) PCT No.: PCT/KR2021/000287
§ 371 (c)(1),
(2) Date: May 5, 2022

(87) PCT Pub. No.: WO2021/141460
PCT Pub. Date: Jul. 15, 2021

(65) Prior Publication Data
US 2022/0393150 A1 Dec. 8, 2022

(30) Foreign Application Priority Data
Jan. 10, 2020 (KR) ........................ 10-2020-0003818

(51) Int. Cl.
H01M 4/1393 (2010.01)
H01M 4/04 (2006.01)
H01M 4/133 (2010.01)
H01M 10/0525 (2010.01)
H01M 4/02 (2006.01)

(52) U.S. Cl.
CPC ......... H01M 4/1393 (2013.01); H01M 4/043 (2013.01); H01M 4/133 (2013.01); H01M 10/0525 (2013.01); *H01M 2004/021* (2013.01); *H01M 2004/027* (2013.01)

(58) Field of Classification Search
CPC .... H01M 4/1393; H01M 4/043; H01M 4/133; H01M 10/0525; H01M 2004/021; H01M 2004/027
See application file for complete search history.

(56) References Cited

U.S. PATENT DOCUMENTS

| | | | |
|---|---|---|---|
| 8,980,787 B2 | 3/2015 | Minoura et al. | |
| 2015/0295233 A1* | 10/2015 | Mutoh | C01B 32/21 427/122 |
| 2019/0260020 A1* | 8/2019 | Yamamoto | H01M 10/0525 |
| 2021/0143425 A1 | 5/2021 | An et al. | |

FOREIGN PATENT DOCUMENTS

| | | | | |
|---|---|---|---|---|
| CN | 101323447 A | | 12/2008 | |
| CN | 106654269 A | * | 5/2017 | ........ H01M 10/0525 |
| CN | 207353381 U | | 5/2018 | |
| CN | 108706582 A | | 10/2018 | |
| CN | 108807995 A | * | 11/2018 | ........ H01M 10/0525 |
| CN | 109292769 A | | 2/2019 | |
| CN | 109437186 A | | 3/2019 | |
| CN | 110137449 A | | 8/2019 | |
| CN | 110203923 A | | 9/2019 | |
| CN | 110289417 A | * | 9/2019 | ........... C01B 32/205 |
| EP | 3 462 521 A2 | | 4/2019 | |
| JP | 10-289718 A | | 10/1998 | |
| JP | 8-337493 A | | 12/1998 | |
| JP | 2011-154972 A | | 8/2011 | |
| JP | 2012-240019 A | | 12/2012 | |
| KR | 10-2012-0137276 A | | 12/2012 | |
| KR | 10-1382964 A | | 4/2014 | |
| KR | 10-2015-0054030 A | | 5/2015 | |
| KR | 10-2018-0040755 A | | 4/2018 | |
| KR | 10-2019-005404 A | | 5/2019 | |

OTHER PUBLICATIONS

Machine translation of CN 110289417-A (Year: 2025).*
Machine translation of CN 106654269A (Year: 2025).*
Machine translation of CN 108807995-A (Year: 2025).*
European Patent Office Extended Search Report dated Jan. 2, 2023 for Eurpean Patent Application No. 21738281.1.
European Communication pursuant to Article 94(3) EPC for European Application No. 21 738 281.1, dated May 31, 2024.
International Search Report (PCT/ISA/2010) issued in PCT/KR2021/000287, dated Apr. 16, 2021.
"Plastic recycle and resource reuse", China Light Industry Press, Dec. 31, 2010, p. 344 (4 pages total), with abstract.

* cited by examiner

*Primary Examiner* — Milton I Cano
*Assistant Examiner* — Albert Michael Hilton
(74) *Attorney, Agent, or Firm* — Birch, Stewart, Kolasch & Birch, LLP

(57) ABSTRACT

A method for preparing artificial graphite, including the steps of: pulverizing a carbonaceous material; carrying out a first deferrization to remove magnetic foreign materials generated by pulverizing the carbonaceous material to form a first deferrization product; granulating the first deferrization product of the first deferrization step to form a granulated product; graphitizing the granulated product to form a graphitized product; and carrying out a second deferrization on the graphitized product to remove magnetic foreign materials from the graphitized product to form the artificial graphite. A negative electrode including the artificial graphite and a lithium secondary battery including the negative electrode are also disclosed.

6 Claims, No Drawings

ARTIFICIAL GRAPHITE, METHOD FOR PREPARING ARTIFICIAL GRAPHITE, ANODE COMPRISING SAME, AND LITHIUM SECONDARY BATTERY

TECHNICAL FIELD

The present disclosure relates to artificial graphite, a method for preparing artificial graphite, a negative electrode including the artificial graphite, and a lithium secondary battery including the same. Particularly, the present disclosure relates to artificial graphite having increased capacity and efficiency by removing metal impurities therefrom, a method for preparing artificial graphite, a negative electrode including the artificial graphite and a lithium secondary battery including the same.

The present application claims priority to Korean Patent Application No. 10-2020-0003818 filed on Jan. 10, 2020 in the Republic of Korea, the disclosures of which are incorporated herein by reference.

BACKGROUND ART

As technical development and needs for mobile instruments have been increased, secondary batteries as energy sources for such mobile instruments have been increasingly in demand. Among such secondary batteries, lithium secondary batteries having a high energy density and operating voltage, a long cycle life and a low discharge rate have been commercialized and used widely.

A lithium secondary battery has a structure including an electrode assembly having a positive electrode and a negative electrode, each of which includes an active material coated on an electrode current collector, and a porous separator interposed between both electrodes; and a lithium salt-containing electrolyte injected to the electrode assembly. The electrode is obtained by applying slurry including an active material, a binder and a conductive material dispersed in a solvent to a current collector, followed by drying and pressing.

Lithium metal has been used to date as a negative electrode of a secondary battery. However, since it was known that lithium metal causes a short-circuit in a battery due to lithium dendrite formation, resulting in a risk of explosion, it has been substituted with a carbonaceous material capable of reversible lithium ion intercalation/deintercalation and maintaining structural and electrical properties.

Such a carbonaceous material has a significantly low discharge potential of about −3 V based on the standard hydrogen electrode potential, and shows excellent electrode cycle life by virtue of significantly reversible charge/discharge behaviors derived from the monoaxial alignability of a graphene layer. In addition, the carbonaceous material shows an electrode potential of 0 V Vs. $Li/Li^+$ upon Li ion intercalation, which is substantially similar to the electrode potential of pure lithium metal. Therefore, when the carbonaceous material forms a battery in combination with an oxide-based positive electrode, higher energy can be obtained advantageously.

As a carbonaceous material, there have been suggested artificial graphite, natural graphite, graphited mesocarbon microbeads, mesophase pitch-based carbon fibers, graphite, whiskers, or the like. All of such carbonaceous materials are characterized by excellent potential flatness and high initial charge/discharge efficiency. Particularly, while artificial graphite is advantageous in that it is cheaper than the other materials, it shows strong anisotropy and is easily pulverized into a scaly shape, when forming powder through the pulverization thereof. Thus, artificial graphite is disadvantageous in that it has low packing density and shows poor processability when manufacturing an electrode plate in a process for manufacturing a battery.

Therefore, some studies have been conducted about pulverization methods in order to apply a carbonaceous material, such as artificial graphite, to a negative electrode active material for a lithium secondary battery.

However, during the pulverization of a carbonaceous material, foreign materials (magnetic foreign materials) of a pulverization apparatus are generated inevitably due to the wearing of the pulverization apparatus, or the like. In addition, such impurities may cause the problems of degradation of the productivity in the process for manufacturing a secondary battery and defects in electrical properties. Particularly, impurities of metallic ingredients in a lithium ion secondary battery may cause safety problems, such as a fire accident and explosion, through various mechanisms.

DISCLOSURE

Technical Problem

The present disclosure is designed to solve the problems of the related art, and therefore the present disclosure is directed to providing artificial graphite having increased capacity and efficiency by removing metal impurities therefrom, a method for preparing artificial graphite, a negative electrode including the artificial graphite, and a lithium secondary battery including the same.

Technical Solution

In one aspect of the present disclosure, there is provided a method for preparing artificial graphite according to any one of the following embodiments.

According to the first embodiment of the present disclosure, there is provided a method for preparing artificial graphite, including the steps of:

pulverizing a carbonaceous material;

carrying out a first deferrization to remove magnetic foreign materials generated by pulverizingthe carbonaceous material to form a first deferrization product;

granulating the first deferrization product to form a granulated product;

graphitizing the granulated product to form a graphitized product; and carrying out a second deferrization on the graphitized product to remove magnetic foreign materials from the graphitized product to form the artificial graphite.

According to the second embodiment of the present disclosure, there is provided the method for preparing artificial graphite as defined in the first embodiment, wherein the carbonaceous material includes needle cokes, mosaic cokes, coal tar pitch, resin pitch, or two or more of them.

According to the third embodiment of the present disclosure, there is provided the method for preparing artificial graphite as defined in the first or the second embodiment, wherein the pulverized carbonaceous material has an average particle diameter ($D_{50}$) of 1-20 μm.

According to the fourth embodiment of the present disclosure, there is provided the method for preparing artificial graphite as defined in any one of the first to the third embodiments, wherein each of the first deferrization and the second deferrization is carried out independently by using an electromagnetic deferrization system or a deferrization system using a permanent magnet.

According to the fifth embodiment of the present disclosure, there is provided the method for preparing artificial graphite as defined in any one of the first to the fourth embodiments, wherein the granulation step is carried out by using a vertical granulation system or a horizontal granulation system.

According to the sixth embodiment of the present disclosure, there is provided the method for preparing artificial graphite as defined in any one of the first to the fifth embodiments, wherein the graphitization step is carried out by using an Acheson graphitization furnace, a box type graphitization furnace or a lengthwise graphitization furnace at a temperature of 2,000-3,400° C.

According to the seventh embodiment of the present disclosure, there is provided the method for preparing artificial graphite as defined in any one of the first to the sixth embodiments, which further includes a step of carbonizing the graphitized product between the graphitization step and the second deferrization step.

According to the eighth embodiment of the present disclosure, there is provided artificial graphite including metallic foreign materials of Fe, Ni, Zn, Cr, Al and Cu, wherein each of Fe, Ni, Zn, Cr, Al and Cu are present in an amount of 1 ppm or less, as determined by an ash impurity analysis.

According to the ninth embodiment of the present disclosure, there is provided a negative electrode including a current collector, and a negative electrode active material layer on at least one surface of the current collector, wherein the negative electrode active material layer includes the artificial graphite as defined in the eighth embodiment.

According to the tenth embodiment of the present disclosure, there is provided a lithium secondary battery including the negative electrode as defined in the ninth embodiment.

Advantageous Effects

According to an embodiment of the present disclosure, a process of removing metal impurities is controlled during a process for preparing artificial graphite to remove magnetic foreign materials, such as metal impurities present in the resultant artificial graphite more effectively. When using the artificial graphite from which the magnetic foreign materials are removed as a negative electrode active material, it is possible to increase the capacity and efficiency of a negative electrode including the same, and to improve the performance of a secondary battery using the negative electrode. It is also possible to solve the problems of a fire accident and explosion caused by metal impurities, and thus to improve the safety of a secondary battery.

BEST MODE

Hereinafter, preferred embodiments of the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In addition, it will be understood that the terms "comprises" and/or "comprising", or "includes" and/or "including" when used in this specification, refer to the presence of any stated features, numbers, steps, elements and/or combinations thereof, but do not preclude the addition of one or more other feature, numbers, steps, elements and/or combinations thereof.

In one aspect of the present disclosure, there is provided a method for preparing artificial graphite, including the steps of:
  pulverizing a carbonaceous material;
  carrying out first deferrization to remove magnetic foreign materials generated in the pulverization step from the pulverized carbonaceous material;
  granulation the resultant product of the first deferrization step;
  graphitizing the granulated product; and
  carrying out second deferrization to further remove magnetic foreign materials from the graphitized product.

Hereinafter, each step of the method for preparing artificial graphite will be explained in detail.

First, a carbonaceous material is pulverized.

The carbonaceous material may include needle cokes, mosaic cokes, coal tar pitch, resin pitch, or two or more of them.

The pulverized carbonaceous material may have an average particle diameter ($D_{50}$) of 1-20 μm, or 5-15 μm.

According to an embodiment of the present disclosure, the average particle diameter ($D_{50}$) of the pulverized carbonaceous material may be determined by diluting the pulverized carbonaceous material with deionized water to 1 wt % to prepare a sample, and measuring the average particle diameter ($D_{50}$) by using a particle size analyzer (DC24000 UHR, CPS Instrument Co.) through the laser diffraction method.

When pulverizing the carbonaceous material, the pulverizing condition and pulverizer may be selected suitably considering the characteristics of the carbonaceous material, including high wearing property, hygroscopic property, lubricability and impact strength and low specific gravity and elastic modulus, during the pulverization.

According to an embodiment of the present disclosure, the step of pulverizing the carbonaceous material may be carried out by using a pulverizer, such as a jet mill, a pin mill or an impact mill, and a circulation type pulverization system including a composite of a pulverizer with a classifier may also be used.

Next, first deferrization is carried out to remove magnetic foreign materials generated in the pulverization step from the pulverized carbonaceous material.

In the step of pulverizing the carbonaceous material, foreign materials, i.e. magnetic foreign materials, of a pulverization apparatus are generated inevitably due to the wearing of the pulverization apparatus, or the like. In the first deferrization step, such magnetic foreign materials are removed from the pulverized cokes.

According to the related art, the pulverized carbonaceous material is not subjected to deferrization but is directly subjected to a granulation step. However, according to the present disclosure, the deferrization step is carried out essentially to remove the magnetic foreign materials from the pulverized carbonaceous material, before carrying out the granulation step. The purpose of deferrization is to remove foreign materials introduced to the process for preparing a crude material in the final step. The reason why the magnetic foreign materials are removed by using an electromagnet is that some of magnetic foreign materials electrochemically cause a defect in voltage in a battery.

When deferrization is carried out from a management point of view for the above-mentioned purpose, carrying out deferrization only once by using a deferrization system in the final step may be sufficient.

However, considering the characteristics of a process (corresponding to the first process) for preparing artificial graphite, foreign materials derived from the wearing of a pulverization system may be introduced due to the friction against the pulverization system during the process for pulverizing a carbonaceous material, such as cokes. Although the introduced foreign materials are partially vaporized and removed through a graphitization step at 2,800° C. or higher, a large amount of metallic foreign materials is incorporated to and present on the surface or the inner part of artificial graphite. This is a problem which has not been recognized to date. Moreover, since the effect of such foreign materials incorporated to the surface or the inner part of graphite upon the performance of a battery has not been disclosed yet, deferrization has not been applied to the step subsequent to the pulverization step.

The present inventors have recognized the problem of introduction of the foreign materials derived from the wearing of a pulverization system caused by the friction against the pulverization system and degradation of the performance of a battery caused by the introduced foreign materials. As a result, according to the present disclosure, the first deferrization step is carried out essentially to remove the magnetic foreign materials from the pulverized carbonaceous material.

The first deferrization step may be carried out by using an electromagnetic deferrization system or a deferrization system using a permanent magnet.

According to an embodiment of the present disclosure, the electromagnetic deferrization system or the deferrization system using a permanent magnet used for the first deferrization step may have a magnetic force of 5,000-40,000 Gauss, 20,000-40,000 Gauss, or 36,000-40,000 Gauss. When the deferrization system satisfies the above-defined range of magnetic force, magnetic foreign materials may be extracted efficiently and the problem of generation of a load to the system may be prevented.

Then, the resultant product of the first deferrization step is granulated.

The granulation step may be carried out by using a vertical granulation system or a horizontal granulation system.

According to an embodiment of the present disclosure, a horizontal granulation system provided with a rotary processing device may be used to process and treat the resultant product of the first deferrization step repeatedly and to perform granulation. As a result of repeated rotation movement, granulation is performed through the pulverization and frictional processing caused by the collision between the inner surface of the processing device and the resultant product of the first deferrization system, shear processing caused by shear stress, or the like, and thus spherical granulated particles can be obtained finally. Herein, the pulverization time and pulverization rate may be controlled in an adequate range depending on the amount of the resultant product of the first deferrization step introduced to the granulation system.

In addition, the granulation step may further include a step of pressurizing the granulated particles isotropically in order to improve the contactability of the resultant product of the first deferrization step during the granulation.

Herein, 'pressurize isotropically' means that the granulated particles are pressurized three-dimensionally uniformly. For the purpose of isotropic pressurization of the spherical granulated particles, a medium, such as water, argon or a mixture of water with argon, may be used at room temperature, or cold isotropic pressurization including isotropic pressurization of the granulated particles at room temperature may be used.

Further, the pressure applied to the isotropic pressurization is not particularly limited, but may be 50-150 MPa, or 70-120 MPa.

According to an embodiment of the present disclosure, the granulation step may be carried out by further incorporating a binding material in order to increase the binding force in the resultant product of the first deferrization step. Non-limiting examples of the binding material include polyvinyl alcohol (PVA), carboxymethyl cellulose (CMC), starch, or the like.

The binding material may be used in an amount of 0.1-10.0 parts by weight based on 100 parts by weight of the resultant product of the first deferrization step.

After that, the granulated product is graphitized.

The granulated product may be graphitized through heat treatment at high temperature.

The graphitization step may be carried out by using an Acheson graphitization furnace, a box type graphitization furnace or a lengthwise graphitization furnace.

According to an embodiment of the present disclosure, the graphitization temperature is not particularly limited, but the graphitization may be carried out at a temperature of 2,000-3,500° C., 2,500-3,500° C., 2,800-3,500° C., or 2,800-3,200° C. When the graphitization temperature satisfies the above-defined range, crystallization of graphite proceeds so that the resultant artificial graphite may have ductility and easy processability, and the graphite surface may undergo less sublimation and the artificial graphite may be warmed with ease.

The graphitization may be carried out by any method. However, the graphitization may be carried out by using an Acheson furnace, in which the granulated product is embedded in the furnace and heat is emitted by applying electric current from an electrode to a fired body, or an induction furnace in which heat is emitted by allowing induction current to flow through a fired body by an induction coil.

Then, second deferrization is carried out to further remove magnetic foreign materials from the graphitized product.

In the second deferrization step, it is possible to remove magnetic foreign materials not removed by the preceding first deferrization step but remaining in the graphitized product and magnetic foreign materials introduced newly in the subsequent granulation step or graphitization step. As a result, it is possible to further increase the capacity and efficiency of the finally obtained artificial graphite.

The second deferrization step may be carried out by using an electromagnetic deferrization system or a deferrization system using a permanent magnet. According to an embodiment of the present disclosure, the second deferrization step may be carried out by using the same system under the same condition as the first deferrization step.

According to an embodiment of the present disclosure, the electromagnetic deferrization system or the deferrization system using a permanent magnet used for the second deferrization step may have a magnetic force of 5,000-40,000 Gauss, 20,000-40,000 Gauss, or 36,000-40,000 Gauss. When the deferrization system satisfies the above-defined range of magnetic force, magnetic foreign materials may be extracted efficiently and the problem of generation of a load to the system may be prevented.

According to an embodiment of the present disclosure, the method may further include a step of carbonizing the graphitized product between the graphitization step and the second deferrization step.

The carbonization step may be carried out by mixing the graphitized product with pitch and carbonizing the resultant mixture at a temperature of 1,000-2,600° C., 1.500-2,000, or 1,500-1,600° C. to perform carbon coating.

In the carbonization step, the surface of the graphitized product, i.e. the graphitized granulated particles, obtained from the preceding step, is mixed homogeneously with pitch as a carbon coating material so that the carbon coating material may be attached to the surfaces of the fired spherical granulated particles, and then carbonization is carried out to form carbon coating layers on the surfaces of the fired spherical granulated particles. The pitch forms coating layers on the surfaces of the spherical granulated particles so that graphite particles forming the spherical granulated particles may be further bound to one another. In this manner, it is possible to prevent degradation of the stability of the spherical granulated particles that may occur due to the repeated charge/discharge cycles. Herein, the mixing step may be carried out by using a vertical/horizontal mixer.

The pitch used as a carbon coating material in the carbonization step may be currently used solid pitch or liquid pitch. The solid pitch may be obtained by pulverizing coal tar pitch, petroleum pitch, synthetic pitch, wood tar pitch, or the like. The liquid pitch may be obtained by dissolving a liquid resin or solid pitch in a solvent, and carrying out coating and carbonization. Herein, the solvent may include hexane, toluene, tetrahydrofuran (THF), quinoline, N-methyl pyrrolidone (NMP), ethanol, or the like.

According to an embodiment of the present disclosure, the solid pitch may have an average particle diameter of 1-7 μm, or 2-4 μm. When the solid pitch satisfies the above-defined range of average particle diameter, it can be distributed homogeneously among the active material particles and mixed therewith so that the surfaces of the active material particles may be coated more uniformly.

Herein, the pitch as a carbon coating material may be used in an amount of 1-10 parts by weight, or 3-5 parts by weight, based on 100 parts by weight of the disintegrated graphitized product (graphitized granulated particles). When the content of the carbon coating layer satisfies the above-defined range, it is possible to prevent the problem of degradation of electrical properties, caused by the formation of an excessively thick coating layer, or the problem of the exfoliation of the coating layer during charge/discharge cycles and degradation of life efficiency, caused by the formation of an excessively thin coating layer. It is also possible to improve the stability of the granulated particles during repeated charge/discharge cycles, and to improve rapid charge/discharge characteristics.

The method for mixing the surfaces of the graphitized granulated particles with the carbon coating material is not particularly limited, and any method generally known to those skilled in the art may be used. For example, the mixing may be carried out by using mechanical and chemical processes, such as a kneader, such as a two-roll, a blade, a mechano micro-system, an extruder, a ball mill, a planetary mill, a mechano-fusion system, a Nobilta, a hybridization or a rotary ball mill, or by using a spray drying process or an emulsifying process.

After the carbon coating material is mixed homogeneously with the graphitized granulated particles as described above, the resultant mixture is carbonized at a temperature of 1,100-1,600° C. Herein, the carbonization may be carried out for 18-30 hours. According to an embodiment of the present disclosure, the carbonization is carried out at a temperature of 1,400-1,600° C. for 20-26 hours so that carbon coating layers may be formed on the graphitized granulated particles. The formed carbon coating layers may include amorphous or crystalline carbon. When the carbonization condition is satisfied, the carbon coating material may be stabilized sufficiently, impurities in the carbon coating material may be removed substantially completely, degeneration of the carbon coating material-coated surface properties at high temperature may be prevented, and battery swelling caused by an increase in swelling of a negative electrode may be prevented.

In another aspect of the present disclosure, there is provided artificial graphite which has a content of each of metallic foreign materials of Fe, Ni, Zn, Cr, Al and Cu of 1 ppm or less, as determined by its ash impurity analysis.

According to an embodiment of the present disclosure, the content of each of metallic foreign materials of Fe, Ni, Zn, Cr, Al and Cu may be 0-1 ppm, or 0.001-1 ppm. When the content of each metallic foreign material satisfies the above-defined range, it can be judged that the foreign materials introduced before the graphitization step are removed to a normal state, and thus an effect of improving the performance of a battery can be expected.

Herein, the ash impurity analysis may be carried out by heating 3 parts by weight of an artificial graphite sample at 800° C. for 12 hours, dipping the sample in 20 parts by weight of aqua regia for 6 hours, and analyzing the amount of dissolved metallic foreign materials through inductively coupled plasma (ICP) analysis.

In still another aspect of the present disclosure, there is provided a negative electrode including a current collector, and a negative electrode active material layer disposed on at least one surface of the current collector, wherein the negative electrode active material layer includes the artificial graphite according to an embodiment of the present disclosure.

The negative electrode active material layer may be obtained by coating slurry for a negative electrode active material obtained by dispersing the negative electrode active material according to the present disclosure, a binder and a conductive material in a solvent onto at least one surface of a current collector, followed by drying and pressing.

The current collector is not particularly limited, as long as it has conductivity, while not causing any chemical change in the corresponding battery. For example, copper, stainless steel, aluminum, nickel, titanium, baked carbon, copper or stainless steel surface-treated with carbon, nickel, titanium, silver, etc., aluminum-cadmium alloy, or the like, may be used. Although the current collector is not particularly limited in its thickness, it may have a thickness of 3-500 μm.

The negative electrode active material may be used in an amount of 80-99 wt % based on the total weight of the negative electrode slurry composition.

The binder is an ingredient which assists the binding between the conductive material and the active material, or the binding to the current collector, and is generally used in an amount of 0.1-20 wt % based on the total weight of the negative electrode slurry composition. Particular examples of the binder include polyvinylidene fluoride-co-hexafluoropropylene (PVDF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylate, styrene butadiene rubber (SBR), lithium polyacrylate (Li-PAA), or the like. Herein, polyvinyl alcohol, carboxymethyl cellulose (CMC), starch, hydroxypropyl cellulose, regenerated cellulose, polyvinyl pyrrolidone, or the like, is a binder and can also function as a thickener of the negative electrode slurry composition.

The conductive material is not particularly limited, as long as it causes no chemical change in the corresponding battery and has conductivity. Particular examples of the conductive material include: carbon black, such as carbon black, acetylene black, Ketjen black, channel black, furnace black, lamp black or thermal black; conductive fibers, such as carbon fibers or metallic fibers; metal powder, such as fluorocarbon, aluminum or nickel powder; conductive whisker, such as zinc oxide or potassium titanate; conductive metal oxide, such as titanium oxide; conductive materials, such as polyphenylene derivatives, or the like. The conductive material may be added in an amount of 0.1-20 wt %, based on the total weight of the negative electrode slurry composition.

The dispersion medium may include water or an organic solvent, such as N-methyl-2-pyrrolidone (NMP), and may be used in such an amount that the negative electrode slurry including the negative electrode active material optionally with a binder and a conductive material may have a desired level of viscosity.

In addition, there is no particular limitation in the coating process of the negative electrode slurry, as long as it is a method used currently in the art. For example, a coating process using a slot die may be used. In addition to this, a Mayer bar coating process, a gravure coating process, a dip coating process, a spray coating process, etc. may be used.

In yet another aspect of the present disclosure, there is provided a lithium secondary battery including the negative electrode. Particularly, the lithium secondary battery may be obtained by injecting a lithium salt-containing electrolyte to an electrode assembly including a positive electrode, the above-described negative electrode, and a separator interposed between the positive electrode and the negative electrode.

The positive electrode may be obtained by mixing a positive electrode active material, a conductive material, a binder and a solvent to form slurry and coating the slurry directly onto a metal current collector, or casting the slurry onto a separate support, peeling a positive electrode active material film from the support and laminating the film on a metal current collector.

The positive electrode active material used in the positive electrode active material layer may be any one active material particle selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic ratio of an element forming oxide, and $0 \le x<0.5$, $0 \le y<0.5$, $0 \le z<0.5$, and $0<x+y+z<1$), or a mixture of at least two of them.

Meanwhile, the same conductive material, binder and solvent as used for manufacturing the negative electrode may be used.

The separator may be a conventional porous polymer film used conventionally as a separator. For example, the porous polymer film may be a porous polymer film made of a polyolefinic polymer, such as ethylene homopolymer, propylene homopolymer, ethylene-butene copolymer, ethylene/hexene copolymer or ethylene/methacrylate copolymer. Such a porous polymer film may be used alone or in the form of a laminate. In addition, an insulating thin film having high ion permeability and mechanical strength may be used. The separator may include a safety reinforced separator (SRS) including a ceramic material coated on the surface of the separator to a small thickness. In addition, a conventional porous non-woven web, such as non-woven web made of high-melting point glass fibers or polyethylene terephthalate fibers, may be used, but the scope of the present disclosure is not limited thereto.

The electrolyte includes a lithium salt as an electrolyte salt and an organic solvent for dissolving the lithium salt.

Any lithium salt used conventionally for an electrolyte for a secondary battery may be used without particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$, or two or more of them.

The organic solvent contained in the electrolyte may be any organic solvent used conventionally with no particular limitation. Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulforan, gamma-butyrolactone, propylene sulfite, and tetrahydrofuran.

Particularly, among the carbonate-based organic solvents, ethylene carbonate and propylene carbonate, which are cyclic carbonates, are organic solvents having high viscosity and a high dielectric constant, and thus may be used preferably, since they can dissociate the lithium salt in the electrolyte with ease. When such a cyclic carbonate is used after mixing it with a linear carbonate having low viscosity and a low dielectric constant, such as dimethyl carbonate or diethyl carbonate, it is possible to prepare an electrolyte having higher electrical conductivity, more preferably.

Optionally, the electrolyte used according to the present disclosure may further include additives contained in the conventional electrolyte, such as an overcharge-preventing agent, or the like.

The lithium secondary battery according to an embodiment of the present disclosure may be obtained by interposing the separator between the positive electrode and the negative electrode to form an electrode assembly, introducing the electrode assembly to a pouch, a cylindrical battery casing or a prismatic battery casing, and then injecting the electrolyte thereto to finish a secondary battery. In a variant, the lithium secondary battery may be obtained by stacking the electrode assemblies, impregnating the stack with the electrolyte, and introducing the resultant product to a battery casing, followed by sealing.

According to an embodiment of the present disclosure, the lithium secondary battery may be a stacked, wound, stacked and folded or cable type battery.

The lithium secondary battery according to the present disclosure may be used for a battery cell used as a power source for a compact device, and may be used preferably as a unit battery for a medium- or large-size battery module including a plurality of battery cells. Particular examples of such medium- or large-size devices include electric vehicles, hybrid electric vehicles, plug-in hybrid electric vehicles, power storage systems, or the like. Particularly, the lithium secondary battery may be useful for batteries for hybrid electric vehicles and new & renewable energy storage batteries, requiring high output.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

(1) Preparation of Artificial Graphite

First, cokes as a raw material was pulverized by using a jet mill to an average particle diameter ($D_{50}$) of 10 μm, and the first deferrization treatment was carried out to remove the magnetic foreign materials contained in the pulverized cokes raw material by using an electromagnetic deferrization system under the condition of a magnetic force of 36,000 Gauss.

The deferrized product was granulated by using a horizontal granulation system at 800° C. for 24 hours.

The granulated product was heat treated at 2,800° C. by using an Acheson graphitization furnace for 400 hours, including heating time and cooling time, to perform graphitization.

Then, 100 parts by weight of the graphitized product was mixed with 5 parts by weight of pitch (solid pitch) as a carbon coating material by using a vertical/horizontal mixer, and carbonization was carried out at a temperature of 1,500° C. for 24 hours to perform carbon coating.

After that, the second deferrization was carried out to remove the magnetic foreign materials mixed with the carbonized product by using an electromagnetic deferrization system under the condition of a magnetic force of 36,000 Gauss, thereby providing artificial graphite.

(2) Manufacture of Negative Electrode

The artificial graphite obtained as described above as a negative electrode active material, styrene butadiene rubber (SBR) as a binder and carboxymethyl cellulose (CMC) as a binder/thickener, and carbon black (Super C65) as a conductive material were mixed at a weight ratio of 90:4:4:2, and water was added thereto to prepare negative electrode slurry.

The resultant slurry was applied to copper foil (current collector) with a loading amount of 3.6 mAh/cm². Then, the current collector coated with the negative electrode slurry was pressed, and vacuum dried at a temperature of about 130° C. for 8 hours to obtain a negative electrode.

(Manufacture of Secondary Battery)

The negative electrode obtained as described above was used as a working electrode and Li metal foil cut into a circular shape with an area of 1.7671 cm² was used as a counter electrode. In addition, a polyethylene separator was interposed between the working electrode and the counter electrode to form an electrode assembly. Then, ethylene carbonate (EC) was mixed with diethyl carbonate (DEC) at a volume ratio of 7:3, and 0.5 wt % of vinylene carbonate (VC) as an additive for non-aqueous electrolyte and 1 M $LiPF_6$ were added to the mixed solvent to prepare a non-aqueous electrolyte. The electrode assembly was received in a coin-type casing and the non-aqueous electrolyte was injected thereto to obtain a coin-type half-cell secondary battery.

Comparative Example 1

First, cokes as a raw material was pulverized by using a jet mill to an average particle diameter ($D_{50}$) of 10 μm.

The pulverized product was granulated by using a horizontal granulation system at 800° C. for 24 hours.

The granulated product was heat treated at 2,800° C. by using an Acheson graphitization furnace for 400 hours, including heating time and cooling time, to perform graphitization.

Then, 100 parts by weight of the graphitized product was mixed with 5 parts by weight of pitch (solid pitch) as a carbon coating material by using a vertical/horizontal mixer, and carbonization was carried out at a temperature of 1,500° C. for 24 hours to perform carbon coating.

After that, deferrization was carried out to remove the magnetic foreign materials mixed with the carbonized product by using an electromagnetic deferrization system under the condition of a magnetic force of 36,000 Gauss, thereby providing artificial graphite.

In addition, a negative electrode and a secondary battery were obtained in the same manner as Example 1.

Evaluation of Characteristics (1) Ash Impurity

First, 3 parts by weight of artificial graphite obtained from each of Example 1 and Comparative Example 1 was heated at 800° C. for 12 hours. Then, the heated artificial graphite was dipped in 20 parts by weight of aqua regia for 6 hours, and the amount of dissolved metallic foreign materials was analyzed through inductively coupled plasma (ICP) analysis. The results are shown in the following Table 1.

TABLE 1

| | Content of metallic foreign material (ppm) | | | | | |
|---|---|---|---|---|---|---|
| | Fe | Ni | Zn | Cr | Al | Cu |
| Comp. Ex. 1 | 95 | 30 | 10 | 3 | 15 | 10 |
| Ex. 1 | 1 | 1 | 1 | 1 | 0 | 1 |

(2) Analysis of Electrochemical Performance

Each of the coin-type half-cell secondary battery according to Example 1 and Comparative Example 1 was charged/discharged under the condition of a charge/discharge voltage of 1.5-0.005 V and a charge cutoff current of 0.005 C at 0.1 C for the first charge/discharge cycle, at 0.2 C for the second charge/discharge cycle, at 0.5 C for the third charge/discharge cycle, at 1.0 C for the fourth charge/discharge, at 1.5 C for the fifth charge/discharge cycle, and at 2.0 C for the sixth charge/discharge cycle. Then, the capacity at each discharge and charge rate was determined. The results are shown in the following Tables 2 and 3, respectively.

TABLE 2

| | Evaluation of performance (mAh/g) of coin-type half-cell secondary battery depending on discharge rate | | | | | |
|---|---|---|---|---|---|---|
| | 0.1 C. | 0.2 C. | 0.5 C. | 1.0 C. | 1.5 C. | 2.0 C. |
| Comp. Ex. 1 | 350 | 349.7 | 339.5 | 324.5 | 311.9 | 298.9 |
| Ex. 1 | 351 | 350.6 | 344.7 | 329.9 | 320.1 | 313.4 |

TABLE 3

| | Evaluation of performance (mAh/g) of coin-type half-cell secondary battery depending on charge rate | | | | | |
|---|---|---|---|---|---|---|
| | 0.1 C. | 0.2 C. | 0.5 C. | 1.0 C. | 1.5 C. | 2.0 C. |
| Comp. Ex. 1 | 353 | 352.6 | 336.4 | 319.6 | 304.5 | 283.5 |
| Ex. 1 | 353 | 352.6 | 344 | 322.9 | 312.4 | 294.8 |

As can be seen from the results of Tables 2 and 3, the secondary battery according to Example 1 shows significantly larger discharge capacity and charge capacity values as the current rate is increased, when compared to the secondary battery according to Comparative Example 1. In other words, the secondary battery of Example 1 is obtained by carrying out deferrization for removing magnetic metallic foreign material both after the step of pulverizing a carbonaceous material and after the graphitization step, according to the method for preparing artificial graphite of an embodiment of the present disclosure. As a result, the content of metallic impurities present in the artificial graphite is minimized, resulting in an increase in capacity and efficiency. In addition, it is thought that any resistance factor unnecessary for lithium ion intercalation/deintercalation is removed, resulting in significant improvement of the performance of the secondary battery using the artificial graphite.

What is claimed is:

1. A method for preparing artificial graphite, comprising the steps of:
    pulverizing a carbonaceous material;
    carrying out a first deferrization to remove magnetic foreign materials generated by pulverizing the carbonaceous material to form a first deferrization product;
    granulating the first deferrization product to form a granulated product;
    graphitizing the granulated product to form a graphitized product; and
    carrying out a second deferrization on the graphitized product to remove magnetic foreign materials from the graphitized product to form the artificial graphite,
    wherein the first deferrization step is performed by using a permanent magnet having a magnetic force in a range of 36,000 Gauss to 40,000 Gauss.

2. The method for preparing artificial graphite according to claim 1, wherein the carbonaceous material comprises at least one of needle cokes, mosaic cokes, coal tar pitch, or resin pitch.

3. The method for preparing artificial graphite according to claim 1, wherein each of the first deferrization and the second deferrization is carried out independently by using an electromagnetic deferrization system or a deferrization system using a permanent magnet.

4. The method for preparing artificial graphite according to claim 1, wherein the granulation step is carried out by using a vertical granulation system or a horizontal granulation system.

5. The method for preparing artificial graphite according to claim 1, wherein the graphitization step is carried out by using an Acheson graphitization furnace, a box type graphitization furnace or a lengthwise graphitization furnace at a temperature ranging from 2,000° C. to 3,500° C.

6. The method for preparing artificial graphite according to claim 1, which further comprises a step of carbonizing the graphitized product between the graphitization step and the second deferrization step.

* * * * *